United States Patent

Tsenter et al.

Patent Number: 6,040,685
Date of Patent: *Mar. 21, 2000

[54] ENERGY TRANSFER AND EQUALIZATION IN RECHARGEABLE LITHIUM BATTERIES

[75] Inventors: Boris Tsenter; Mikhail Golod, both of Roswell, Ga.

[73] Assignee: Total Battery Management, Inc., Chamblee, Ga.

[*] Notice: This patent is subject to a terminal disclaimer.

[21] Appl. No.: 08/838,570

[22] Filed: Apr. 10, 1997

Related U.S. Application Data

[63] Continuation-in-part of application No. 08/771,030, Dec. 20, 1996, Pat. No. 5,729,116, which is a continuation-in-part of application No. 08/699,130, Aug. 16, 1996, Pat. No. 5,900,718.

[51] Int. Cl.[7] .................................................. H01M 10/44
[52] U.S. Cl. ......................... 320/160; 320/139; 320/162; 320/163; 320/21
[58] Field of Search ................................. 320/162, 139, 320/160, 163, 164, 161

[56] References Cited

U.S. PATENT DOCUMENTS

| | | |
|---|---|---|
| 3,487,284 | 12/1969 | Cady . |
| 3,890,556 | 6/1975 | Melling et al. . |
| 3,911,349 | 10/1975 | Seeley et al. . |
| 3,911,350 | 10/1975 | Swope . |
| 3,953,302 | 4/1976 | Rao et al. . |
| 4,016,473 | 4/1977 | Newman . |
| 4,079,303 | 3/1978 | Cox . |
| 4,086,525 | 4/1978 | Ibsen et al. . |
| 4,139,680 | 2/1979 | Schlaikjer . |
| 4,345,008 | 8/1982 | Breault . |
| 4,385,269 | 5/1983 | Aspinwall et al. . |
| 4,388,582 | 6/1983 | Saar et al. . |
| 4,392,101 | 7/1983 | Saar et al. . |
| 4,414,291 | 11/1983 | Breault . |
| 4,554,500 | 11/1985 | Sokara . |
| 4,560,937 | 12/1985 | Finger . |
| 4,680,528 | 7/1987 | Mikami et al. . |
| 4,725,784 | 2/1988 | Peled et al. . |
| 4,746,854 | 5/1988 | Baker et al. . |
| 4,761,487 | 8/1988 | Godshall . |
| 4,806,840 | 2/1989 | Alexander et al. . |
| 5,017,856 | 5/1991 | Johnson, Jr. . |
| 5,057,762 | 10/1991 | Goedken et al. . |
| 5,119,009 | 6/1992 | McCaleb et al. . |
| 5,132,626 | 7/1992 | Limuti et al. . |
| 5,143,799 | 9/1992 | Tsenter . |
| 5,157,320 | 10/1992 | Kuriloff . |
| 5,166,596 | 11/1992 | Goedken . |
| 5,179,335 | 1/1993 | Nor . |
| 5,200,689 | 4/1993 | Interiano et al. . |
| 5,206,578 | 4/1993 | Nor . |
| 5,237,257 | 8/1993 | Johnson et al. . |

(List continued on next page.)

OTHER PUBLICATIONS

Damon W. Chu, "Tradeoffs in Implementing Intelligent Battery Management", Jul. 10, 1995, 6 pgs.
David Freeman, "Freeing Portables from Battery Tyranny," Jul. 10, 1995, 6 pgs.

Primary Examiner—Peter S. Wong
Assistant Examiner—Pia Tibbits
Attorney, Agent, or Firm—Reed Smith Shaw & McClay LLP

[57] ABSTRACT

A method of charging a rechargeable lithium battery which comprises charging the battery with a charging current; sampling a charging voltage of the battery during charging to recognize potential electrolyte decomposition; interrupting the charging current periodically to create current-free periods and sampling an open circuit voltage of the battery at a plurality of points during each current-free period to identify potential shunting and unequal states of charge among individual cells of the battery; lowering the charging current if any of the above-identified adverse conditions are identified and continuing charging with the charging current if the potential adverse charging condition is not identified; and terminating charging when the charging current is lowered below a pre-determined minimum level.

21 Claims, 5 Drawing Sheets

U.S. PATENT DOCUMENTS

| | | |
|---|---|---|
| 5,278,000 | 1/1994 | Huang et al. . |
| 5,290,640 | 3/1994 | Tsenter et al. . |
| 5,291,117 | 3/1994 | Rydborn . |
| 5,296,997 | 3/1994 | Betton et al. . |
| 5,304,915 | 4/1994 | Sanpei et al. . |
| 5,304,917 | 4/1994 | Somerville . |
| 5,307,000 | 4/1994 | Podrazhansky et al. . |
| 5,321,347 | 6/1994 | Chien . |
| 5,329,219 | 7/1994 | Garrett . |
| 5,330,861 | 7/1994 | Fetcenko et al. . |
| 5,331,268 | 7/1994 | Patino et al. . |
| 5,343,380 | 8/1994 | Champlin . |
| 5,349,281 | 9/1994 | Bugaj . |
| 5,350,995 | 9/1994 | Iketani . |
| 5,350,996 | 9/1994 | Tauchi . |
| 5,352,967 | 10/1994 | Nutz et al. . |
| 5,365,160 | 11/1994 | Leppo et al. . |
| 5,369,364 | 11/1994 | Renirie et al. . |
| 5,376,873 | 12/1994 | Toya . |
| 5,391,193 | 2/1995 | Thompson . |
| 5,396,163 | 3/1995 | Nor et al. . |
| 5,408,170 | 4/1995 | Umetsu et al. . |
| 5,411,537 | 5/1995 | Munshi et al. . |
| 5,412,306 | 5/1995 | Meadows et al. . |
| 5,418,084 | 5/1995 | Georgopoulos . |
| 5,422,559 | 6/1995 | Hall et al. . |
| 5,432,029 | 7/1995 | Mitate et al. . |
| 5,432,426 | 7/1995 | Yoshida . |
| 5,432,429 | 7/1995 | Armstrong, II et al. . |
| 5,440,221 | 8/1995 | Landau et al. . |
| 5,442,274 | 8/1995 | Tamai . |
| 5,444,353 | 8/1995 | Shinohara . |
| 5,449,996 | 9/1995 | Matsumoto et al. . |
| 5,449,997 | 9/1995 | Gilmore et al. . |
| 5,460,899 | 10/1995 | Charkey . |
| 5,467,005 | 11/1995 | Matsumoto et al. . |
| 5,483,165 | 1/1996 | Cameron et al. . |
| 5,489,836 | 2/1996 | Yuen . |
| 5,498,492 | 3/1996 | Hara et al. . |
| 5,500,583 | 3/1996 | Buckley et al. . |
| 5,694,023 | 12/1997 | Podrazhansky et al. . |
| 5,729,116 | 3/1998 | Tsenter . |

ENERGY TRANSFER AND EQUALIZATION IN RECHARGEABLE LITHIUM BATTERIES

This application is a continuation-in-part of U.S. application Ser. No. 08/771,030, filed Dec. 20, 1996, now U.S. Pat. No. 5,729,116, issued Mar. 17, 1998 which is a continuation-in-part of U.S. application Ser. No. 08/699,130, filed Aug. 16, 1996, now U.S. Pat. No. 5,900,718, issued on May 4, 1999.

BACKGROUND OF THE INVENTION

1. Field of the Invention

The present invention relates generally to a method of recharging secondary lithium based batteries and more particularly to a method and apparatus for enhanced cycle life for secondary lithium batteries resulting from recognition of potential shunting, electrolyte decomposition, and unequal states of charge between individual cells of the battery, all of which are conditions which may occur during recharging of lithium batteries.

2. Background and Description of the Related Art

As miniaturization and power saving have proceeded in the field of electronics, secondary batteries using alkaline metals such as lithium have attracted attention. Rechargeable lithium batteries operating at room temperature offer several advantages compared to conventional aqueous technologies, including: higher energy density (up to 150 Wh/kg, 300 Wh/L); higher cell voltage (up to about 4 V per cell); and longer charge retention or shelf life (up to 5 to 10 years). These advantages result in part from the high standard potential and low electrochemical equivalent weight of lithium. Rechargeable lithium batteries can be classified into essentially five different classifications. The first type is a solid-cathode cell which uses intercalation compounds for the positive electrode, a liquid organic electrolyte, and metallic lithium as the negative electrode. The second type is a solid-cathode cell which uses intercalation compounds for the positive electrode, a polymer electrolyte, and a metallic lithium negative electrode. The third type uses intercalation compounds for both the positive and the negative electrode and a liquid or polymer electrolyte and are commonly referred to as lithium ion cells. The fourth type are inorganic electrolyte cells which use the electrolyte solvent or solid redox couple for the positive electrode and lithium metal for the negative electrode. The fifth general type are cells include lithium alloy anodes, liquid organic or polymer electrolytes, and a variety of cathode materials, including polymers.

One of the problems with using rechargeable lithium cells is the reactivity of metallic lithium with the electrolyte. This reaction is not thermodynamically stable in most organic electrolytes. Accordingly the surface of the lithium is normally covered by a film of the resulting reaction products. Each time lithium is stripped and replated during discharge and charge, a new lithium surface is exposed and passivated with a new film of reaction products, consuming both lithium and electrolyte.

Another problem is electrolyte decomposition. Electrolyte decomposition often occurs if the cell's voltage during charging exceeds the maximum voltage of the cell. In this situation, the rate of electrolyte decomposition is directly proportional to the magnitude by which the voltage of the battery exceeds the maximum voltage of the battery or overvoltage of the battery. The overvoltage is the difference between the voltage across the battery and the ultimate electrolyte decomposition voltage or maximum voltage of the battery ($V-V_{MAX}$). Decomposition of the electrolyte results in increased internal resistance in the battery and ultimately battery failure. A principle cause of electrolyte decomposition is the charging of the battery under constant voltage after achieving of $V_{MAX}$. Any time the predetermined maximum voltage is achieved or exceeded, electrolyte decomposition occurs. Under constant current charging, this condition of exceeding the maximum voltage of the battery can occur for a relatively long period of time with resulting severe electrolyte decomposition. Conversely, if the battery is charged at a rate which is lower than the maximum voltage to prevent electrolyte decomposition, the battery will be undercharged and cell cycle life will diminish.

Traditionally, in order to achieve reasonable cycle life, a three to five fold excess of lithium is required in rechargeable lithium cells. Beyond the increased reactivity caused by a three to five fold increase in reactive lithium, the lithium which is electroplated onto the metallic surface during recharging is much more porous than the original metal. The porous lithium results in a larger surface area of lithium being deposited and exposed to the electrolyte. In addition, the freshly formed lithium that is plated during recharging is highly reactive, as well as more susceptible to forming dendrites which can short circuit or electrically shunt the battery. Since the reaction of metallic lithium with the electrolyte is exothermic, even minimally exothermic lithium-electrolyte reactions can rapidly increase the internal temperature of the battery after a plurality of charge-discharge cycles.

Another problem with charging rechargeable lithium based batteries is unequal or different states of charge between individual cells within the battery. The difference in cells capacity of the battery will often result in overcharge or overdischarge of the individual cells. This is a particular adverse consequence when using lithium based batteries since they are very sensitive to overcharge and overdischarge. An example of a particularly adverse consequence of cell overdischarge is the corrosion of the copper current collector on the negative electrode. This results in an increase in the internal resistance of the battery.

Overdischarge also may cause an irreversible change in the crystal structure of the positive electrode ($MnO_2$, $CoO_2$, or $NiO_2$) due to deep cathodic polarization of the positive electrode. Other battery chemistries (i.e. nickel based batteries utilizing water electrolyte) can be overcharged to avoid unequal states of charge in individual cells because they employ a "chemical pathway" to equalize the individual cells. For example, nickel based batteries can rely on an oxygen cycle to equalize individual cells and convert excess electrical energy into heat. However, lithium based batteries do not have an oxygen cycle, and typically are equalized by monitoring each cell's voltage during charging, and charging or discharging a particular cell to equalize the individual cells. Simply monitoring the voltage of the individual cell, however, does not take into consideration the internal resistance of the cell, which may cause a cell or group of cells to appear to need adjusted when in reality there are no differences in the state of charge of the individual cells.

In recent years a new generation of rechargeable batteries have been introduced employing an intercalated carbon material as the negative electrode instead of metallic lithium. Intercalation of lithium ion occurs during the discharging process and de-intercalation of lithium ion occurs during the charging process. The use of a carbon matrix is designed to avoid the problems associated with the earlier metallic lithium batteries by eliminating electroplating of metallic lithium and thus prevent dendrite formation and minimize the chemical reaction of lithium metal and the electrolyte by eliminating the availability of lithium metal. However, in many instances the use of the carbon matrix only initially avoids the problem of reactive surface area due to electroplating or shunting. A cause of this may be electroplating of lithium metal on the external surface of the carbon matrix. As a result, these newer generation batteries may face many of the same cycle file and safety concerns encountered by the earlier generation lithium batteries.

U.S. Pat. No. 5,481,174 assigned to Motorola attempts to address the formation or appearance of shunts by regulating the average current, the current being dependent on a control time of reaching a pre-selected maximum voltage. Although this approach does help alleviate the decomposition of the electrolyte, it requires discharging of the cell and does not address the role of a time factor for current adjustment.

U.S. Pat. No. 5,442,274 teaches the use of hysteresis or repetitive peak and through charging prior to constant voltage charging. During peak charging, the battery is charged by a constant current or quasi-constant current, and during the trough of the charging wave, the battery charging process is either suspended or the charging current is reduced from the level at peak charging. This is a simplified charging process which does not adequately address the electrolyte decomposition concerns associated with lithium batteries.

U.S. Pat. No. 4,736,150 discusses the benefits of pulse charging to prolong the cycle life for a lithium molybdenum disulfide ($Li/MoS_2$) batteries. Again this method does not address the cycle life problems or issues confronted when using lithium based rechargeable batteries.

The Benchmark Microelectronics reference discloses a hysteresis charging profile which uses a pulse current between maximum and predetermined minimum voltages. This technology which regulates current through frequency modulation avoids current tipper and can not be acceptable for lithium based batteries. The constant current amplitude creates problems associated with diffusion resistance as a result of ion transport problems inside the solid positive electrode. This resistance leads to an increase in the battery voltage and therefore to battery undercharge.

A need exists in the art for a method of charging lithium based batteries which improves cycle life, efficiency, and safety of the batteries.

SUMMARY OF THE PRESENT INVENTION

The present invention is directed to a battery charger for rechargeable lithium secondary cells which is capable of preventing electrolyte decomposition, recognizing potential shunting, and identifying accurately the need to equalize unequal states of charge between individual cells. The battery charger itself comprises a power supply to provide charging current to the battery, a charge interrupter for periodically interrupting the charging current, a voltage sensor for sampling a voltage of the battery, a data compiler for compiling and analyzing the voltage values to identify a voltage point or points indicative of adverse conditions within the battery, a charging current adjuster for either adjusting or terminating the charging current when the voltage points indicative of adverse conditions within the cell are identified. The voltage sampler is capable of sampling charging voltage and open circuit voltage at a plurality of points and preferably feeds this information to a microprocessor or data compiler.

The voltage sampler samples chemical polarization values during a plurality of currentless phases to derive information regarding chemical polarization within the battery. As will be discussed more fully herein, the chemical polarization information provides an accurate indicator of potential shunting. The voltage sampler samples the steady open circuit voltage $E_e$ during a plurality of points and feeds this information to the microprocessor or comparator to identify potential electrolyte decomposition within the battery. To avoid electrolyte decomposition when charging, the present invention charges the battery with constant current (or hysteresis charging at an equivalent capacity) and drops the amplitude of the charging current amplitude as soon as a predetermine level of voltage is reached. Tapering the amplitude of the current allows the present method to avoid voltage rise as result of diffusion resistance inside the positive electrode.

Charging at different current amplitudes allows the present invention to provide strong control conditions in response to potential shunt creation. The total capacity is the summary of the partial products of current and time. Accordingly, as long as the time period which extends charging at a lower charging level results in the same charging capacity as with constant current, constant voltage or hysteresis pulse charging technology at higher amplitudes any of these techniques may be employed.

The method of the present invention provides a means to charge a battery with a charging current and to sample and analyze the voltage of the battery at pre-determined time intervals to identify one or more points indicative of electrolyte decomposition, potential shunting, and unequal states of charge between individual cells. If one of these points is identified, charging is adjusted. Otherwise charging is continued until one of these points is identified, indicated, or recognized. The voltage sampled during charging is sampled at a plurality of time intervals. To obtain steady open circuit $E_e$ and chemical polarization voltage $V_{CP}$, the open circuit voltage of the battery is sampled during a plurality of currentless phases. If the open circuit voltage is sampled 5 ms after the charging current is interrupted and preferably closer to 5 seconds (5,000 ms) after the charging current is interrupted, a quasi-stationary or steady open circuit voltage $E_e$ can be obtained. Subtracting $E_e$ from an open circuit voltage value obtained during the same currentless phase period, but sampled within the range of 1–5 ms, $E_i$, after the charging current has been interrupted permits proper calculation of a chemical polarization value, $V_{CP}$. Monitoring $V_{CP}$ over pre-determined period of time provides the slope of $V_{CP}$ vs. time ($dV_{CP}/dt$). A change in the chemical polarization slope may be used as an indicator of the potential for shunting.

The invention proposes procedure for equalization capacity of individual cells based on the open circuit voltage measurements. These measurements provide a means to recognize a "true" difference in individual cells capacity as compared to a "false" reading that may be obtained with measuring the voltage of the individual cells. In this case the steady open circuit voltage $E_e$ of each cell is used rather than the charging voltage of each cell because it is more accurate of the state of charge of the individual cells.

Finally, the charging voltage is monitored so that if the charging voltage $V_t$ reaches or exceeds $V_{MAX}$ of battery, the charging current is adjusted or terminates.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
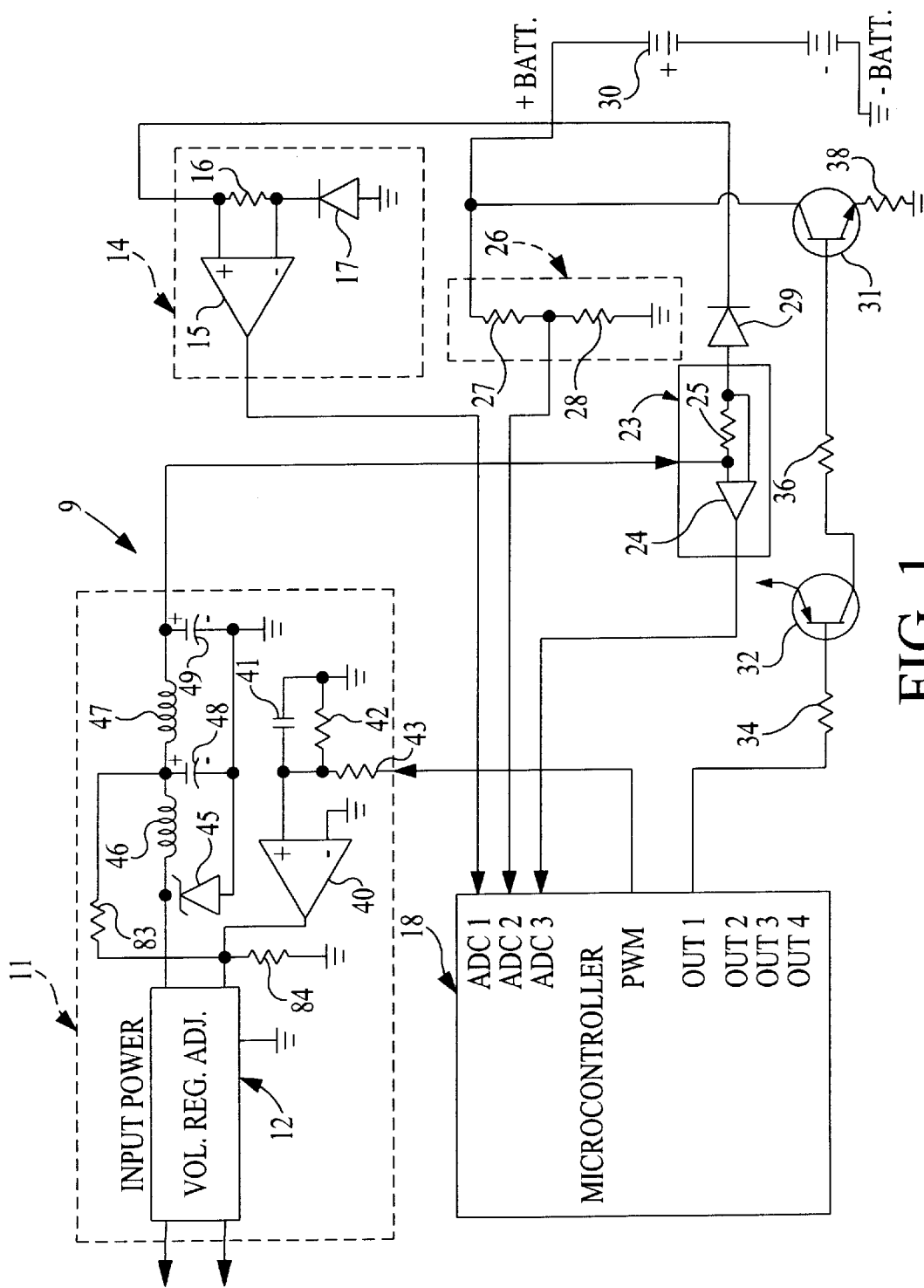
FIG. 1 illustrates a schematic circuit diagram for the preferred embodiment of a battery charger according to the present invention.

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

In view of the related art, there exists a need for a battery charger which minimizes electrolyte decomposition, provides a warning of potential dendrite formation or shunting, and provides proper equalization of individual lithium cells. Such a battery charger would increase the cycle life of the battery, increase the efficiency with which lithium based secondary batteries are charged, and minimize the safety concerns.

The battery charger and method of recharging lithium based batteries disclosed herein focuses on the rechargeable lithium ion cells. However, the principles of the present invention can be extended to include the other types of rechargeable lithium based batteries. The rechargeable lithium ion batteries use an intercalation compound as both the positive and negative electrodes and a liquid or polymer electrolyte, preferably a liquid organic electrolyte. In these types of cells, the carbon materials are designed to reversibly accept and donate significant amounts of lithium (Li:C is equal to about 1:6) without effecting the mechanical and electrical properties of the cell. It has been found that coke-type carbon, having physical properties such as ash content <0.1%, surface area <10 $m^2/g$, true density <2.15 gram/$cm^2$, and an inner layer spacing greater than 3.45 A is preferable for lithium ion system. These types of carbon materials can provide about 185 mAh/g capacity (corresponding to $LiC_{12}$). Doping with nitrogen, boron or phosphorous can increase capacity of the coke-type materials to 370 mAh/g. Graphitic carbons having an innerlayer spacing of 3.36 A can deliver 370 mAh/g capacity in some select electrolytes.

In accordance with the present invention, FIG. 1 illustrates a schematic circuit diagram for the preferred embodiment of the present invention. Battery charger 9 is comprised of the necessary elements for achieving the methodology described herein, and includes: a power manager 11 connected to a power supply (not shown). Microcontroller 18 which is utilized to control the power manager 11 and receive information through a first voltage feed back circuit 14 and second voltage feedback circuit 26 and from current feedback circuit 23. Microcontroller 18 is typically comprised of analog/digital converters ADC1, ADC2, ADC3, software or hardware based pulse width modulator (PWM), input/output (I/O) ports OUT1, OUT2, OUT3, OUT4, read only memory and timers. Output voltage is controlled by microcontroller 18 and fed to power manager 11. The output control voltage is filtered by resistors 42, 43 and capacitor 41 and through the operational amplifier 40 which is fed to the power manager 11. Using the voltage at the output of operational amplifier 40, first resistor 83 and second resistor 84, and the adjustable voltage regulator 12 sets the voltage at diode 45. Inductors 46 and 47, capacitors 48 and 49, and diode 45 are used to filter the voltage. Current feedback is derived by measuring the voltage across shunt 25 by operational amplifier 24. Diode 29 prevents the introduction of voltage from rechargeable lithium battery 10 from being fed back into the charger 9. Voltage feedback from the first cell 32 is provided by voltage feedback circuit 14 comprised of a shunt 16, zener diode 17 and operational amplifier 15. Since zener diode 17 is used, the feedback voltage from the first cell 32 will not be full scale (zero to the battery's maximum voltage) but will be the scale of the zener diode's 17 voltage to the battery's maximum voltage. Voltage feedback from the first cell 33 is provided by voltage feedback circuit 26 comprised of resistors 27 and 28 which form a voltage divider. Transistors 30 and 31 equalize the batteries cells 32 and 33. The transistors 30 and 31 are under the control of the microcontroller 18. Lights 19 and 21 display the charging status. Resistors 20 and 22 limit the current supplied to lights 19 and 21. A temperature detector (not shown) or sensor may be utilized to measure the temperature T of the battery 10. Although not critical to the present invention, the temperature detector may be useful as a default mechanism to prevent explosive reactions from taking place. The collected information is fed to a microcontroller 18 which can in turn signal adjustment or termination of the charging current of power manager 11. The microcontroller 18 is used to run and monitor the operation of the battery charger 9 and to compile and analyze the charging voltage values to identify the end of charging, the onset of shunting the onset of electrolyte decomposition, and unequal states of charge between first cell 32, and second cell 33. The microprocessor 18 will signal termination of the charging current if the potential shunting is identified or if charging is complete. A data compiler may or may not be integrated into microcontroller 18 and may function to compile the charging and open circuit voltage information to thereby minimize the microprocessor time dedicated to this task. Battery charger 9 is precise enough to measure the open circuit voltage within 1 millisecond of charge interruption to thereby obtain information regarding both the ohmic and chemical polarization components of the cell or battery 10. The limitation of 1 ms being adequate for measuring the necessary open circuit voltage data points in the present invention.

Although the solid structure of a lithiated carbon matrix is designed to prevent the lithium electrode from sporadically increasing its size or surface area during the battery charging and discharging process, the reversible potential for the lithium metal incorporated within the carbon matrix is in the range of 10 to 40 mV more negative than the reversible potential of the lithium metal. Therefore, as a rule, lithium should electroplate inside the carbon matrix. However, during the normal cycle life of the battery 10 or during over voltage conditions, the lithium can precipitate on the external surface of the carbon matrix As used herein, a hard shunt is a shunt which affects the safety of the battery 10, and a soft shunt is a shunt which effects the operation of the battery 10, and which if goes unrecognized will eventually result in a hard shunt. A chemical shunt is non-electrical in nature and can be specified as the chemical reaction between lithium metal and the electrolyte and the deleterious consequences resulting therefrom.

It is the difference between the state of charge for each individual cell which results in overcharge or overdischarge of individual cells. As a result of the cells being overcharged or overdischarged, the cycle life of the battery is greatly reduced due to irreversible decomposition and loss of electrolyte in the battery. Unlike nickel based batteries, there is no chemical mechanism for overcharge protection in lithium based batteries.

Figure 2:
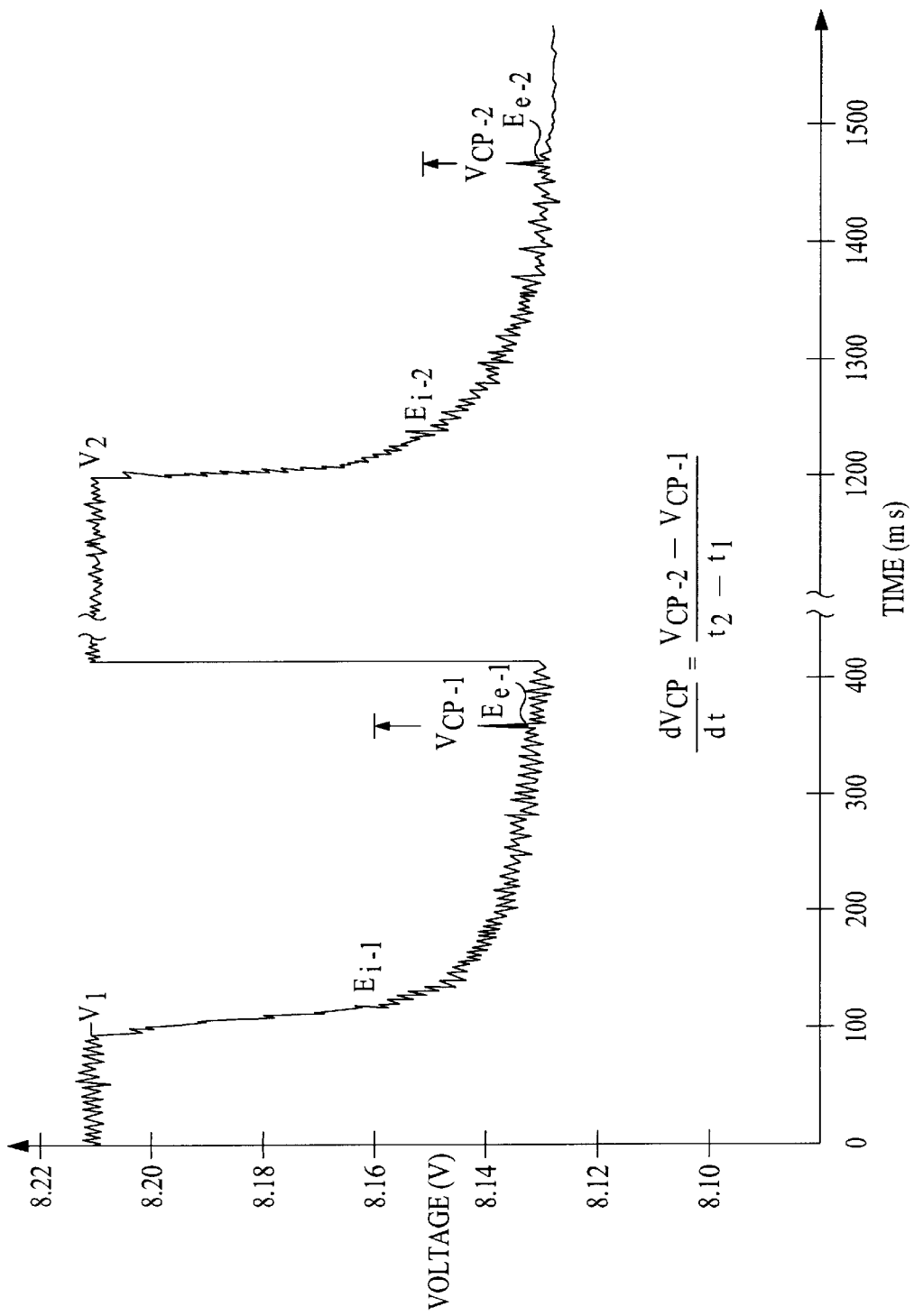
FIG. 2 is a graph illustrating a portion of a typical charging and data sampling scheme according to the present invention.

FIG. 2 illustrates the importance of understanding the voltage components that are present in battery 10 when the current is interrupted to measure the open circuit voltage $V_{OCV}$ of the battery. Both chemical and electrical phenomena must be taken into consideration. When the charging rate, $I_{ch}$, exceeds the maximum diffusion rate, $I_d$ of the lithium ion, metallic lithium dendrites can form. In order to prevent dendrite formation during charging the charging rate should be maintained at a rate less than the maximum rate of diffusion ($I_{ch}<I_d$). This is often difficult due to a number of factors including an uneven current distribution (increased local $I_{ch}$) or decreased maximum rate of diffusion ($I_d$) due to Li$^+$ ion concentration decreasing.

This invention proposes a procedure for control of condition associated with appearance of maximum current of diffusion. Indeed: the expression for battery charging voltage can be written as follows.

$$V=E_e+I(R_{CP}+R_\Omega) \quad (1)$$

where V is the battery voltage, $E_e$ is the steady open circuit voltage, $R_{CP}$ is the chemical resistance due to chemical polarization and $R_\Omega$ is the ohmic resistance due to the ohmic components of the battery. The chemical resistance includes the electrochemical and diffusion increments of polarization of the electrode and the electrolyte.

The steady or quasi-steady open circuit voltage $E_e$ includes the polarization in solid phase of the transition metal oxide electrode. Equation (1) can be rewritten in terms of overvoltage as:

$$V=E_e+V_{CP}+V_\Omega \quad (2)$$

where $V_{CP}$ is the voltage due to chemical components of the cell and $V_\Omega$ is the voltage due to the ohmic component of the cell. $V_\Omega$ is associated with the ohm component of cell resistance and disappears almost immediately after current interruption. From FIG. 2, $V_{CP}$ (i.e. $V_{CP-1}$ in FIG. 2) is the difference between the open circuit voltage in the initial moments after current interruption, $E_i$ (i.e. $E_{i-1}$ in FIG. 2) and steady open circuit voltage, $E_e$ (i.e. $E_{e-1}$ in FIG. 2) Initial open circuit voltage, $E_i$, is the sum of the chemical component $V_{CP}$ and the "steady" open circuit voltage $E_e$ of the battery and to some extent an ohmic component $V_\Omega$. However, the ohmic component, $V_\Omega$, dissipates so rapidly, that in the range of 1 to 5 milliseconds after current interruption $E_i$ consists primarily of chemical polarization, $V_{CP}$, and steady open circuit voltage $E_e$. Accordingly it is preferable to sample the initial circuit voltage $E_i$ of the chemical component of the voltage, $V_{CP}$, within the range of 1–1,000 milliseconds, more preferably in the range of 1–100 ms, even more preferably in the range of 1–10 ms and most preferably within the range of 1–5 milliseconds after current interruption. After 500 milliseconds, the open circuit voltage can be considered substantially free of both the ohmic and chemical components of the battery 10. The maximum amount of time that should pass after current interruption to sample $V_{CP}$ is in the range of 5–1,000 ms because this is generally the time interval necessary for the chemical polarization component to dissipate and the open circuit voltage to become substantially stationary.

As seen in FIG. 2 since we measure $E_e$ at a time period where the chemical component has dissipated, we can obtain the chemical component of the first sampled time period by:

$$V_{CP1}=V_1-V_{\Omega 1}-E_{e1} \quad (3)$$

where $V_1$ is the first sampled charging voltage, $V_{\Omega 1}$ is the first sampled ohmic component, $E_{e1}$ is the first sampled steady open circuit voltage. The difference between $V_1$ and $V_{\Omega 1}$ is equal to $E_i$. Although, as seen in FIG. 2 the open circuit voltage at 275 milliseconds is not truly steady, as long as the later sampled steady open circuit voltage $E_{e-2}$ is measured at the same time interval after interrupting the charging current there should not be a substantial impact on $V_{CP}$ since $V_{CP}$ will be normalized. The same sequence of events is repeated for the next measurement period wherein $V_2$ is the later sampled charging voltage, $V_{\Omega -2}$ is the later sampled ohmic component, and $E_{e2}$ is the later sampled steady open circuit voltage. It can be seen that both slope $dV_{CP}/dt$ information and the recognition of a difference $(E_e-E_i)$ can be obtained from these samples. Accordingly, it is preferably to measure $d(E_i-E_{e1})/dt$ value and compare this with $d(E_{i2}-E_{e2})/dt$ to obtain or recognize a rise in the chemical polarization value.

From eqs. 1 and 2 it can be recognized that a rise in diffusion resistance results in an increase in the chemical polarization, $V_{CP}$. Thus the monitoring of a change in the chemical polarization voltage versus time provides a chrono-potentiometric technique for avoiding shunt conditions. The change in chemical polarization versus time can be written as per formula used in theory of chrono-potentiometry:

$$dV_{CP}/dt=\text{Constant}+(RT/F)\ln(t^{1/2}-t^{1/2})/t^{1/2} \quad (4)$$

where $t^{1/2}$ is transition time and R is gas constant, T is temperature, and F is Faraday's number. From this expression it can be seen that the chemical polarization rises very fast as time passes. Accordingly, a dramatic rise in the chemical polarization slope, $dV_{CP}/dt$ indicates that the charging current should be tapered back.

Figure 3:
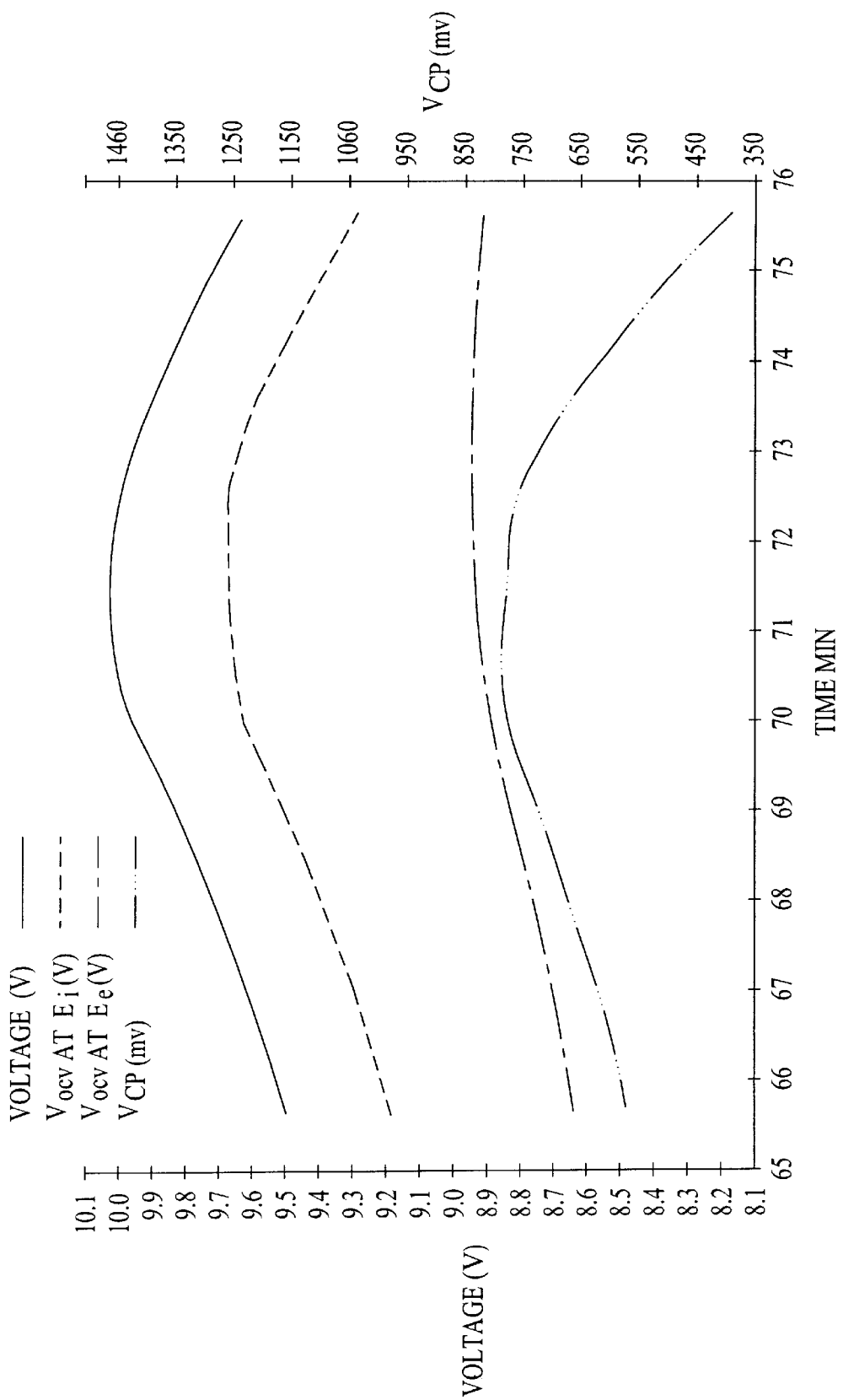
FIG. 3 is a graph illustrating the use of $dV_{CP}/dt$ as a signal to terminate or adjust the charging.

In FIG. 3, the $V_{CP}$ is sampled and plotted at five minute intervals. Accordingly at 35 minutes the $V_{CP}$ is equal to approximately 80 mV (point a) at 40 minutes the $V_{CP}$ is equal to approximately 89 mV (point b), at 45 minutes the $V_{CP}$ is equal to approximately 90 mV (point c), at 50 minutes the $V_{CP}$ is equal to approximately 92 mV (point d); and at 55 minutes the Vcp is equal to approximately 149 mV (point e). The $dV_{CP}/dt$ for points:

b–a is 90 mV–89 mV/5 min.=1.8 mV/min.;

c–b is 90 mV–89 mV/5 min.=0.2 mV/min.;

d–c is 92 mV–90 mV/5 min.=0.4 mV/min.; and e–d is 149 mV–92 mV/5 min.=11.4 mV/min.

A dramatic rise in the chemical polarization slope is preferably at least a two to ten fold increase over the previously derived $dV_{CP}/dt$, even more preferable is a four fold increase, and most preferably be greater than a five fold increase over the previous calculated $dV_{CP}/dt$. From above it can be seen that the $dV_{CP}/dt$ of points e–d being equal to 11.4 mV/min. is a dramatic increase over the previous $dV_{CP}/dt$ of points d–c and the charging current should be tapered. Experience with a particular type of battery allows one to determine a pre-determined increase in chemical polarization voltage over time $dV°_{CP}/dt$ which when exceeded indicates that there is a potential for shunting. In this case such a rise could be in the range of 10–12 mV/min. Thus, the preferred methodology of charging includes the use of a rise in $dV_{CP}/dt$ as an indicator of potential shunting, and the indicator can either be based on a multiple or factor of a previously derived value or on a pre-determined increase in chemical polarization voltage over time.

Figure 4:
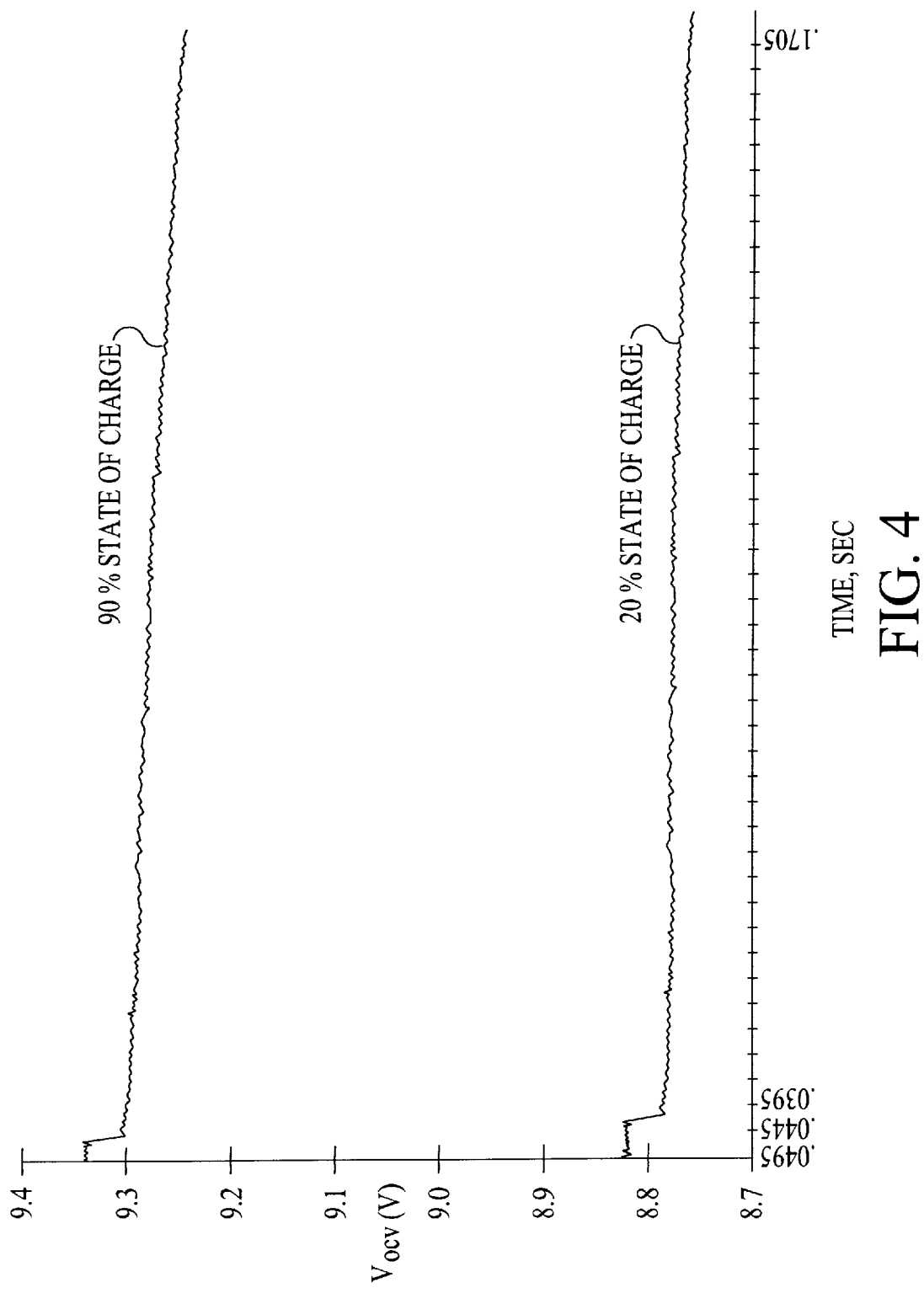
FIG. 4 is a graph of the voltage, and current, versus time for a lithium based battery being charged with a constant current.
Figure 5:
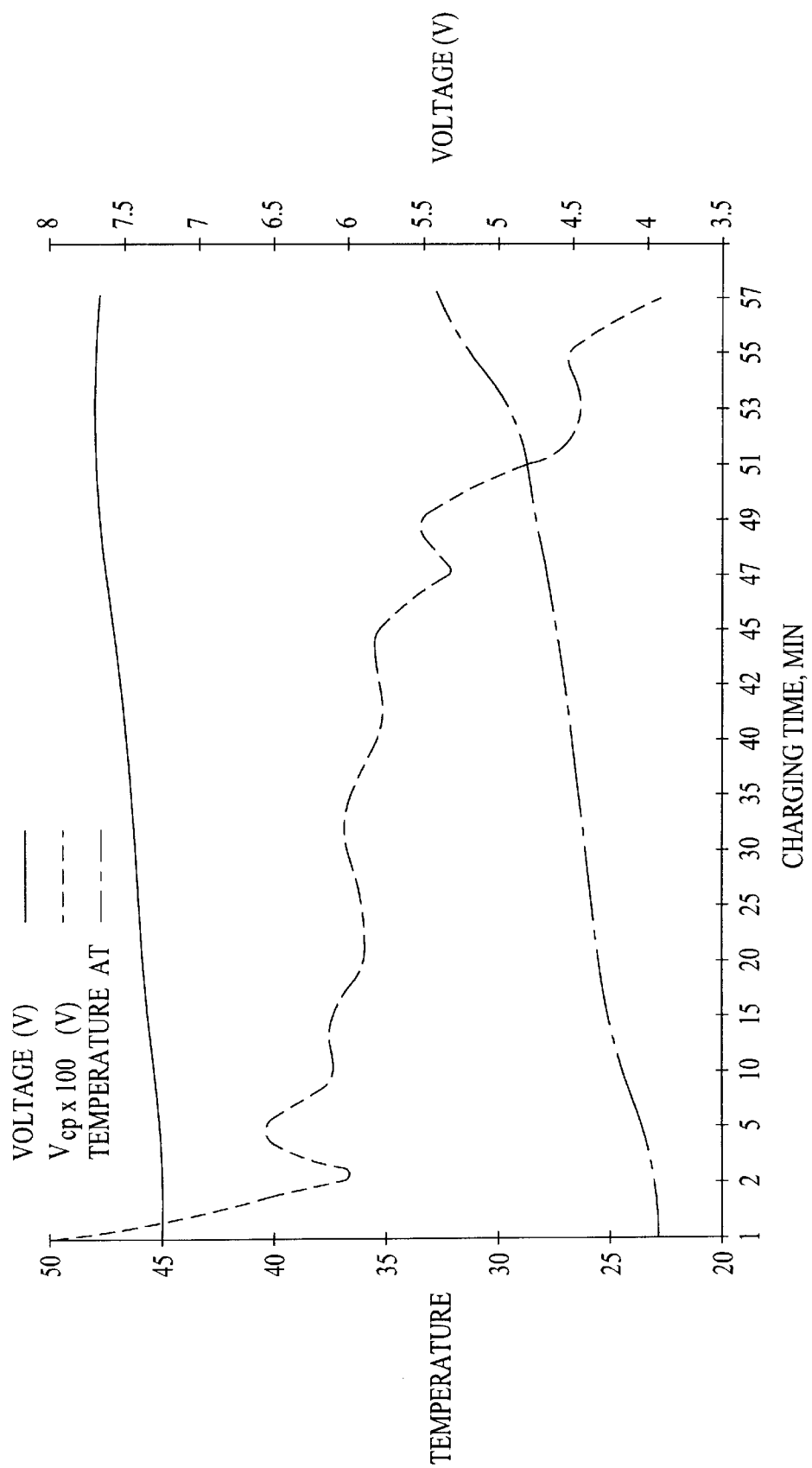
FIG. 5 is a graph illustrating a charging profiles utilizing the methodology described herein.

The most preferable method would also incorporate a method to avoid the problem of substantial electrolyte decomposition. As briefly discussed above, one of the major problems associated with constant-current charging is electrolyte decomposition. As seen in FIG. 4 constant current-constant voltage charging can result in severe electrolyte decomposition. As voltage of battery 10 reaches it maximum voltage, supporting battery 10 under constant voltage may result in increased internal resistance. The present methodology avoids substantially electrolyte decomposition and the associated increased internal resistance by initially charging with a constant current or similar amplitude hysteresis peaking and shifting to a tapered charging methodology prior to the battery 10 entering the "zone of potential electrolyte decomposition". The "zone of potential electrolyte decomposition" may occur when the maximum voltage, $V_{max}$, of the battery 10 is reached. As described above when the voltage V of the battery exceeds $V_{max}$, electrolyte decomposition may occur. As can be seen in FIG. 5, the preferred method of charging comprises charging with repetitive hysteresis peak and trough charging until the voltage of the battery 10 is substantially near the maximum voltage of the battery 10 ($V_{max}$) and then the charging current tapering. The degree of tapering is dependent on the previous amplitude and charging time. As a general rule, the charging current is tapered preferably at a rate of 10–60% of the previous charging rate more preferably at a rate of 15%–45%, or the previous charging rate, and more preferably at a rate of 25%–30% of the previous charging rate resulting in the voltage of the battery being adjusted as soon as the maximum voltage is achieved. Thus the voltage of the battery only "touches" the $V_{max}$ for a small period of time and the condition of overcharge is limited. The range of 10–60% is based on the fact that dropping the current by less than 10% is not sufficient to avoid the electrolyte decomposition as it is very nearly the same environment as constant current charging and if the charging current is dropped by more than 60% of the previous value, undercharging is often observed. Thus dropping the charging current to in the range of 10–60% range of the previous charging current is the preferred range for the charging method disclosed herein.

As can be seen from FIG. 2 and FIG. 5, the method of charging as disclosed herein is much more advantageous than traditional constant current-constant voltage charging technology. This is due to the fact that the battery 10 stays below the maximum voltage almost the entire charging period and just reaches and touches maximum voltage for very short period of time. The present methodology substantially avoids electrolyte decomposition by avoiding voltage rise beyond the maximum voltage of battery 10. It may also be important to incorporate a gradual tapered increase in charging current at the beginning of charging, for example, raising the current gradually by 20% of the maximum charging current until the ultimate voltage of the battery is achieved (4.2 V/cell Fe.).

Another aspect of the present invention which may be incorporated into the preferred methodology is the equalization of individual cells 32, 33 within the rechargeable lithium based battery 10. Simply monitoring the voltage of the individual cell does not take into consideration the internal resistance of the cell 32, 33 or battery 10, which may cause the battery or cell 10 to appear to need charged when in reality there are no differences in the state of charge of the individual cells. When monitoring the voltage of the battery 10, increased resistance in first cell 32 may give a false voltage of the battery due to the relationship of $\Delta V=IR$. assuming the current is constant. If first cell 32 has a high internal resistance as compared to second cell 33, it will appear that first cell 32 will need to be shunted and second cell 33 will need to be charged to equalize the cells 32, 33. The unique aspect of the present equalization technique is that it uses the steady or quasi-steady open circuit information to provide an indicator of the need to equalize individual cells 32, 33. A higher $E_e$ in first cell 32 will be a true indicator that it should be shunted, and conversely a lower $E_e$ in second cell 33 will be an indicator that charging should be continued. The equalization procedure should be begun when any cell reaches the maximum voltage for the individual cell (i.e. $V_{MAX}$ for lithium-cobalt oxide chemistry is 4.2 V).

The equalization procedure include charging the cell 32, 33 with the lower value of $E_e$ or discharging the cell 32, 33 with higher value of $E_e$. This value should be sampled in the middle of charging process (under predetermined value of $E_e$) in order to increase the measurements precision.

As described above, it is preferable to incorporate any one or all of the: recognition of shunts by a rising $dV_{CP}/dt$; avoidance of electrolyte decomposition by monitoring the $V_{max}$ of the battery 10; and equalization of individual cells 32, 33 in the battery 10 using a difference in quasi-steady open circuit voltage to indicate the need for equalization. FIG. 5 illustrates a charging scheme wherein each of the elements are incorporated.

In FIG. 5, the rechargeable lithium battery 10 is initially charged at a current near the capacity of the battery (i.e. in the range of 0.75-1C-A 1C capacity theoretically provides a full charge to battery 10 in one hour). This charge is provided with a pulse duration which equals approximately 20 s and is filtered by a currentless period of about 280 ms. $E_i$ is sampled after 2 ms from beginning of rest period and $E_e$ is sampled in the end of rest period (near 280 ms). The chemical polarization is derived from difference between values $E_i$–$E_e$ values ($E_i$–$E_e$).

The time period to interrupt the charging current can be extended in the initial stages of charging and in fact can be eliminated altogether until $V_{max}$ is reached. However, it is more preferable to hysteresis charge and monitor for potential dendrite formation (a rise in $dV_{CP}/dt$) or unequal states of charge in cells 32,33 by monitoring for differences in quasi-stationary open circuit voltage E. If at any time during charging $dV_{CP}/dt$ exceeds a predetermined rise $dV°_{CP}/dt$ or the voltage, V, of the battery 10 exceeds the maximum voltage of the battery 10, $V_{max}$, ($V>V_{max}$) the charging current is reduced by a factor of 10–60% of the previous value. This cycle is repeated until the charging current is at a predetermined minimum value. As can be seen from FIG. 5, the charging current is reduced each time V achieves $V_{max}$ by a factor of 30–50% the previous value. In FIG. 5, this cycle is repeated through seven current adjustment periods. As a general rule, charging is terminated when residual current is 5–10% of initial charging current.

Although the preferred methods have been described in detail, it should be understood that the various changes, substitutions and alterations can be made without departing from the spirit and scope of the invention as defined by the claims appended hereto.

What is claimed is:

1. A method of charging a rechargeable lithium battery comprising:

charging the battery with a charging current;

sampling a charging voltage of the battery during charging;

interrupting the charging current periodically to create a current-free period;

sampling an open circuit voltage of the battery during the current-free period;

identifying a potential adverse charging condition within the rechargeable battery from said sampled charging voltage or said sampled open circuit voltage;

lowering the charging current if the potential adverse charging condition is identified;

continuing charging with the charging current if the potential adverse charging condition is not identified; and terminating charging when the charging current is lowered below a pre-determined minimum level.

2. The method of claim 1, wherein the potential adverse charging condition within the battery is identified by the charging voltage exceeding the pre-determined maximum voltage for the battery.

3. The method of claim 2, wherein the adverse charging condition indicated by the charging voltage exceeding a pre-determined maximum voltage for the battery is potential electrolyte decomposition within the battery.

4. The method of claim 3, wherein said voltage sampled during charging is sampled at a plurality of time intervals.

5. The method of claim 1, wherein the adverse charging condition within the battery is identified by an increase in chemical polarization voltage over time, $dV_{cp}/dt$, which is greater than or equal to a pre-determined increase in chemical polarization voltage over time, $dV°_{cp}/dt$.

6. The method of claim 4, wherein the adverse charging condition indicated by the increase in chemical polarization voltage over time, $dV_{cp}/dt$, being greater than or equal to the pre-determined increase in chemical polarization voltage over time, $dV°_{cp}/dt$, is potential shunting.

7. The method of claim 5, wherein the open circuit voltage is sampled at a plurality of time periods during the currentless period.

8. The method of claim 7, wherein a first open circuit point is sampled during said sampling period in a range of 1–5 ms after the charging current has been interrupted and a second point is sampled in a range of 200–500 ms after current interruption.

9. The method of claim 1, wherein the step of sampling the open circuit voltage includes sampling an open circuit voltage value for individual cells of the battery.

10. The method of claim 6, wherein the adverse charging condition within the battery is identified by unequal open circuit voltage values among individual cells.

11. The method of claim 7, wherein the adverse charging condition indicated by the unequal open circuit voltage values among individual cells is a condition of unequal states of charge among the individual cells.

12. The method of claim 1, wherein the adverse charging condition within the battery is identified by a pre-determined increase in chemical polarization voltage over time derived from a later sampling period, $dV_{cp-2}/dt_2$, when compared to a chemical polarization voltage over time derived from an earlier sampling period, $dV_{cp-1}/dt_1$.

13. The method of claim 12, wherein the adverse charging condition indicated by the pre-determined increase is potential shunting.

14. The method of claim 13, wherein the later sampling period occurs within a range of 10–60 seconds of the earlier sampling period.

15. The method of claim 1, wherein the step of lowering the charging current includes lowering the charging current to a lower charging current which is in the range of 10–60% of the charging current.

16. The method of claim 1, wherein the pre-determined minimum level is about 15% of the maximum voltage of the battery.

17. A method of charging a rechargeable lithium battery comprising:

charging the battery at a rate near capacity of the battery;

sampling a charging voltage of the battery;

interrupting the charging of the battery to sample an open circuit voltage of the battery;

identifying one or more points indicative of adverse conditions within the battery;

continuing the charging if the point indicative of adverse conditions is not identified;

lowering the charging current if the point indicative of adverse conditions is identified; and terminating the charging when the charging current reaches a pre-determined minimum value.

18. The method of claim 17, wherein the point indicative of adverse conditions within the battery is selected from the group consisting of:

a. an increase in chemical polarization voltage over time which exceeds a pre-determined increase in chemical polarization over time;

b. the charging voltage of the battery exceeding a predetermined maximum voltage of the battery;

c. a difference between stable open circuit voltage values for individual cells; and d. a function of any two or all three of the above points.

19. A battery charger capable of recognizing conditions adverse to battery cycle life in a rechargeable lithium battery comprising:

a power supply to provide charging current to said battery or cell;

a charge interrupter for periodically interrupting the charging current;

a voltage sensor for sampling voltage values of the battery;

a data compiler for compiling and analyzing the voltage values to identify a voltage point indicative of conditions adverse to battery cycle life; and a charging current adjuster for adjusting the charging current when said voltage points are identified.

20. The battery charger of claim 19, wherein the sampled voltage values of the battery are selected from the group consisting of: a charging voltage value, V; a steady open circuit value $E_e$; and a chemical polarization voltage value, $V_{CP}$.

21. The battery charger of claim 20, wherein the sampled voltage values are indicative of potential adverse conditions within the battery.

* * * * *